D. MILLER.
MUSICAL GAME APPARATUS.
APPLICATION FILED NOV. 14, 1918.

1,325,103. Patented Dec. 16, 1919.

INVENTOR
Dorothy Miller.
BY
George J. Thorpe
ATTORNEY

UNITED STATES PATENT OFFICE.

DOROTHY MILLER, OF KANSAS CITY, MISSOURI.

MUSICAL-GAME APPARATUS.

1,325,103.　　　　Specification of Letters Patent.　　Patented Dec. 16, 1919.

Application filed November 14, 1918. Serial No. 262,474.

*To all whom it may concern:*

Be it known that I, DOROTHY MILLER, a citizen of the United States, residing at Kansas City, in the county of Jackson and State of Missouri, have invented certain new and useful Improvements in Musical-Game Apparatus, of which the following is a specification.

This invention relates to musical games and is designed more especially for teaching the different kinds of notes and their values in a competitive and therefore entertaining manner, and my object is to produce a simple and economical game apparatus of the character set forth.

To this end the invention consists in certain novel and useful features of construction and organization of parts as hereinafter described and claimed; and in order that the invention may be fully understood reference is to be had to the accompanying drawing, in which:

Figure 1:
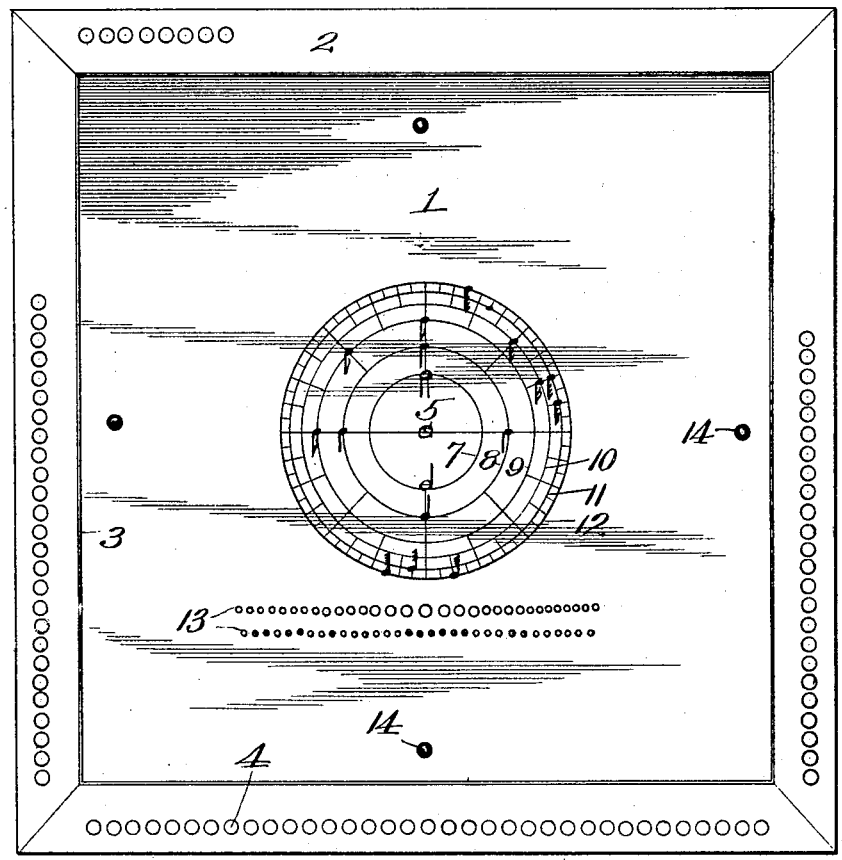
Figure 1, is a plan view of the apparatus.
Figure 2:
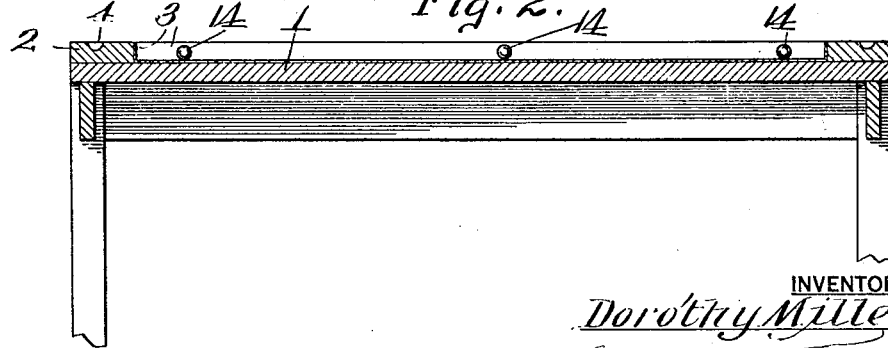
Fig. 2, is a vertical section of the same.

In the said drawing, 1 indicates a board preferably rectangular, though it may be of any other contour, and said board is provided with a marginal strip 2, constituting a wall 3 inclosing the upper or field surface of the board. The strip is provided with pockets 4 in its upper side for holding marbles hereinafter referred to.

Represented on the center of the field is a number of points or marks 5, representative of either notes or rests of different values, from a whole note or rest to a sixty-fourth note or rest, there being two points for half notes or rests, four for quarter notes or rests, sixteen for sixteenth notes or rests, thirty-two for thirty-second notes or rests, and sixty-four for sixty-fourth notes or rests, and the points of the notes or rests of like value are preferably disposed equal distances from the central point which represents a whole note or rest. If preferred adjacent each point may appear a representation of a note and rest of the proper value—only a small number of the points being so identified on the drawing to avoid confusion in the reading thereof. As shown there are six circles numbered 7, 8, 9, 10, 11 and 12, the center of which is the point for the whole note or rest. Upon the innermost circle 7, at diametrically opposite points, appear the points for two half notes or rests; upon the next larger circle appears equi-spaced stations for the quarter notes or rests, and this arrangement is carried out for the remaining notes or rests of diminishing value.

This game may be played with the notes or rests most commonly found in simple music, that is with notes or rests decreasing in value from a whole note or rest to a sixteenth note or rest, but, of course, may be played with notes or rests diminishing in value up to and including a sixty-fourth note or rest. To play the game there are provided correspondingly marked marbles 13, and by preference the marbles representing the note or rest of greatest value and the others representing diminishing values will be of diminishing diameter respectively. The marbles will be placed upon the proper stations as above described.

In playing this game each player will be provided with a shooter or taw 14, and the players play in turn. Any player making a successful play has the right to make another play. The object is to shoot or roll the shooter or taw so as to displace one of the marbles from the field, and when this is successful the displaced marble is placed in its corresponding pocket 4, and as it is so placed the player should name the marble, that is whether it is a whole, one-half, one-fourth, one-eighth, etc., it being understood that the pockets along each side of the board will correspond in number to the number of stations on the field and that the pockets will be identified by marks representative of notes or rests of proper value.

The winning of the game may depend upon who succeeds in gaining the whole note or rest marble or any particular marble or combination of marbles, but the game will preferably continue until all of the marbles have been displaced from the field.

The game can be played for note values, that is can be played in four-four, two-two and six-eight time. It teaches that in four-four time the value of a whole note or rest is four counts, a one-half note or rest two counts, a one-fourth note or rest one count, a one-eighth note or rest one-half count, etc. When played in two-two time it will teach that the values decrease one-half, that is the value of a whole note or rest is two counts, one-half note or rest one count, one-fourth note or rest one-half count, and a one-eighth note or rest one-fourth count, etc., and that in six-eight time the values double that of the four-four time, that is that the value of a one-eighth note or rest is one count, one-fourth note or rest two counts, one-half note or rest four counts and a whole note or rest eight counts.

It is obvious that these games may be of such character that they will find favor among adults as well as among children and may be the means of instruction as well as entertainment for such players.

From the above description it will be seen that I have produced a device of the character described which possesses all of the features of advantage enumerated as desirable, and while I have illustrated and described the preferred form of the invention it is to be understood that I reserve the right to make all changes properly falling within the principle of construction involved and the spirit and scope of the appended claims.

I claim:

1. A game apparatus, comprising a field containing points for characters of different name or value, displaceable objects stationed on the field at such points, one or more taws to be shot or rolled on the field in the endeavor to effect displacement of one or more of said objects from the respective station or stations, and points outside the field, corresponding in name or value to the different stations, for the reception of the objects displaced from the respective field stations.

2. A game apparatus, comprising a field containing points for characters of different name or value, displaceable objects to be stationed on the field at such points, one or more taws to be shot or rolled on the field in the endeavor to effect displacement of one or more of said objects from the respective station or stations, and pockets corresponding in name or value to the different stations, for the reception of the objects displaced from the respective field stations.

3. A game apparatus, comprising a field containing points for characters of different name or value, displaceable objects to be stationed on the field at such points and bearing characters of name or values corresponding to such points, one or more taws to be shot or rolled on the field in the endeavor to effect displacement of one or more of said objects from the respective station or stations, and points outside the field, corresponding in name or value to the different stations, for the reception of the objects displaced from the respective field stations.

4. A game apparatus, comprising a field containing a point representative of a whole note or rest, two points representative of half notes or rests, four points representative of one quarter notes or rests, and other points representative of other notes or rests of diminishing value, there being enough points of each kind to represent a single whole note or rest in value, displaceable objects stationed on the field at the points mentioned and bearing characters of name or value corresponding to such points, one or more taws to be shot or rolled on the field in the endeavor to effect displacement of one or more of said objects from the respective station or stations, a wall inclosing said field, and pockets outside the field corresponding in name or value to the different stations, for the reception of the objects displaced from the respective field stations.

In testimony whereof I affix my signature.

DOROTHY MILLER.